(12) United States Patent
Ahlstrom et al.

(10) Patent No.: US 9,076,020 B2
(45) Date of Patent: Jul. 7, 2015

(54) PROTECTED MODE FOR MOBILE COMMUNICATION AND OTHER DEVICES

(75) Inventors: Eric Ahlstrom, Sammamish, WA (US); Jenna Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 454 days.

(21) Appl. No.: 13/107,029

(22) Filed: May 13, 2011

(65) Prior Publication Data

US 2012/0291101 A1    Nov. 15, 2012

(51) Int. Cl.
| | | |
|---|---|---|
| G06F 21/00 | (2013.01) | |
| G06F 21/74 | (2013.01) | |
| G06F 21/62 | (2013.01) | |
| H04M 1/725 | (2006.01) | |
| H04W 4/00 | (2009.01) | |
| H04L 29/06 | (2006.01) | |
| H04W 12/08 | (2009.01) | |

(52) U.S. Cl.
CPC .............. *G06F 21/74* (2013.01); *G06F 21/629* (2013.01); *H04L 63/104* (2013.01); *H04M 1/72577* (2013.01); *G06F 21/6218* (2013.01); *G06F 2221/2149* (2013.01); *H04W 4/001* (2013.01); *H04W 12/08* (2013.01); *G06F 2221/2105* (2013.01)

(58) Field of Classification Search
CPC ..................................................... G06F 21/74
USPC ............................................................ 726/2
See application file for complete search history.

(56) References Cited

U.S. PATENT DOCUMENTS 6,145,083 A * 11/2000 Shaffer et al. ...................... 726/7
6,243,809 B1 * 6/2001 Gibbons et al. ................... 713/1

(Continued)

OTHER PUBLICATIONS

Author Unknown, "Set Up Parental Controls", 2011 Microsoft Corporation, http://windows.microsoft.com/en-us/windows7/Set-up-Parental-Controls Apr. 1, 2011.

(Continued)

*Primary Examiner* — Mohammad L Rahman
(74) *Attorney, Agent, or Firm* — Bryan Webster; Kate Drakos; Micky Minhas

(57) ABSTRACT

An electronic device includes at least one memory unit, a plurality of applications residing on at least one of the memory units and a database residing on at least one of the memory units. The database is configured to store a record specifying a subset of the plurality of applications that are to be inaccessible to a user when in a protected mode of operation. The protected mode is designed for a user (e.g., child or friend borrowing the device) who can potentially use the device with setting that are configured under the primary user's (e.g. parent, device administrator) supervision. The device also includes a user interface through which a primary user and not other users can specify the subset of the plurality of applications to be included in the record. A processor is operatively associated with the memory unit, the database and the user interface. The processor is configured to switch, in response to a request from the primary user and not other users, between a normal mode operation in which all of the applications in the plurality of applications are available for use and the protected mode of operation.

20 Claims, 4 Drawing Sheets

(56) References Cited

U.S. PATENT DOCUMENTS

| | | | |
|---|---|---|---|
| 6,286,102 B1* | 9/2001 | Cromer et al. | 726/35 |
| 6,433,818 B1* | 8/2002 | Steinberg et al. | 348/161 |
| 7,046,139 B2 | 5/2006 | Kuhn et al. | |
| 7,290,284 B1* | 10/2007 | Wettergren | 726/27 |
| 7,428,585 B1 | 9/2008 | Owens, II et al. | |
| 7,739,707 B2 | 6/2010 | Sie et al. | |
| 7,836,192 B2 | 11/2010 | Johnson et al. | |
| 7,849,311 B2* | 12/2010 | Donlin et al. | 713/164 |
| 7,869,790 B2 | 1/2011 | Singh et al. | |
| 7,996,682 B2* | 8/2011 | Schutz et al. | 713/182 |
| 8,270,977 B2* | 9/2012 | Yang | 455/436 |
| 8,479,288 B2* | 7/2013 | Martin et al. | 726/23 |
| 2005/0010810 A1* | 1/2005 | Broyles et al. | 713/200 |
| 2005/0138415 A1 | 6/2005 | Russell et al. | |
| 2005/0198319 A1 | 9/2005 | Chan et al. | |
| 2007/0013515 A1 | 1/2007 | Johnson et al. | |
| 2007/0039037 A1 | 2/2007 | Son et al. | |
| 2007/0113079 A1* | 5/2007 | Ito et al. | 713/166 |
| 2008/0201469 A1 | 8/2008 | Reasor et al. | |
| 2009/0083520 A1* | 3/2009 | Kanemura | 712/43 |
| 2010/0024020 A1* | 1/2010 | Baugher et al. | 726/7 |
| 2010/0235923 A1 | 9/2010 | Schepis et al. | |
| 2011/0034242 A1 | 2/2011 | Aronzon et al. | |
| 2011/0099609 A1* | 4/2011 | Malhotra et al. | 726/4 |
| 2012/0127179 A1* | 5/2012 | Aspelin | 345/441 |
| 2012/0135683 A1* | 5/2012 | Lee et al. | 455/41.2 |

OTHER PUBLICATIONS

Author Unknown, "Parental Controls", Wikipedia, http://en.wikipedia.org/wiki/Parental_controls, Apr. 1, 2011.

"Nintendo DSi & Nintendo DSi XL-Settings-Parental Controls", Retrieved at <<http://www.nintendo.com/consumer/systems/dsi/en_na/settingsParentalControls.jsp>>, Retrieved Date: Feb. 24, 2011, pp. 4.

"Windows 7 Feature Focus: Guest Mode", Retrieved at <<http://www.winsupersite.com/article/windows-7/windows-7-feature-focus-guest-mode.aspx>>, Retrieved Date: Feb. 24, 2011, pp. 5.

* cited by examiner

PROTECTED MODE FOR MOBILE COMMUNICATION AND OTHER DEVICES

BACKGROUND

Mobile communication devices are often capable of performing many different functions. For instance, such devices may support any of a variety of applications, such as a telephone application, a video conferencing application, an e-mail application, an instant messaging application, a blogging application, a digital camera application, a digital video camera application, a web browsing application, a digital music player application, and/or a digital video player application, and so on. A design assumption is that the user can be fully trusted and is given full authority over the device.

However, in many cases, the role of the device user is different from the role of the device owner or responsible party. Often the devices are given by an owner or more generally, any party that is responsible for the given device, to some end user. For instance, a parent may give a mobile communication device to a teenager, and a corporate or government manager may assign a mobile communication device to his or her employee. In one particular example, parents often give over their devices to a child to play a game or other entertaining activity. While using the device, children can easily exit out of a given application and access anything else (i.e. email, file stores, internet, etc.).

Parental controls exist for devices such as televisions and computers. For example, parental-control applications may allow a parent to monitor and control the content a child may access over the Internet. However, traditional parental-control applications may focus on web content (e.g., monitoring and blocking websites) and chat activity (monitoring conversations and blocking buddies). More generally, traditional parental-control applications roughly fall into four categories: content filters, which limit access to age-appropriate content, usage controls, which constrain the usage of these devices such as placing time-limits on usage or forbidding certain types of usage, computer usage management tools, which allow parents to enforce learning time into child computing time, and monitoring, which can track location and activity when using the devices.

SUMMARY

In some implementations a computing device may be placed in a protected mode so that only certain features are available to the user. In some cases the features available to the user in the special mode are chosen by a user or owner of the device. Once in the protected mode a user cannot get out of the protected mode unless they are able to disable it using a password or by performing a certain task to switch it over to a normal mode of operation. Even if a user tries to turn off the device it remains in the protected mode. When the user turns the device on again it remains in the protected mode.

In one particular implementation, when the device administrator wants to establish a protected mode for a particular user, the administrator activates the protected mode by entering a passcode or by performing another pre-established task that is to remain unknown to other users. In response, a user interface is presented on the display of the device. The user interface presents a list of applications resident on the device and a series of radio buttons or like which allow the administrator to select the applications or features that can be accessed in the protected mode that is being established. When a user other than the device administrator attempts to access or otherwise use an application or feature that the device administrator has allowed access to while in the protected mode, the application opens and behaves as in the normal mode of operation. In addition, the user will be prevented from accessing other features or applications that have been prohibited by the administrator when establishing the protected mode.

DETAILED DESCRIPTION

Figure 1:
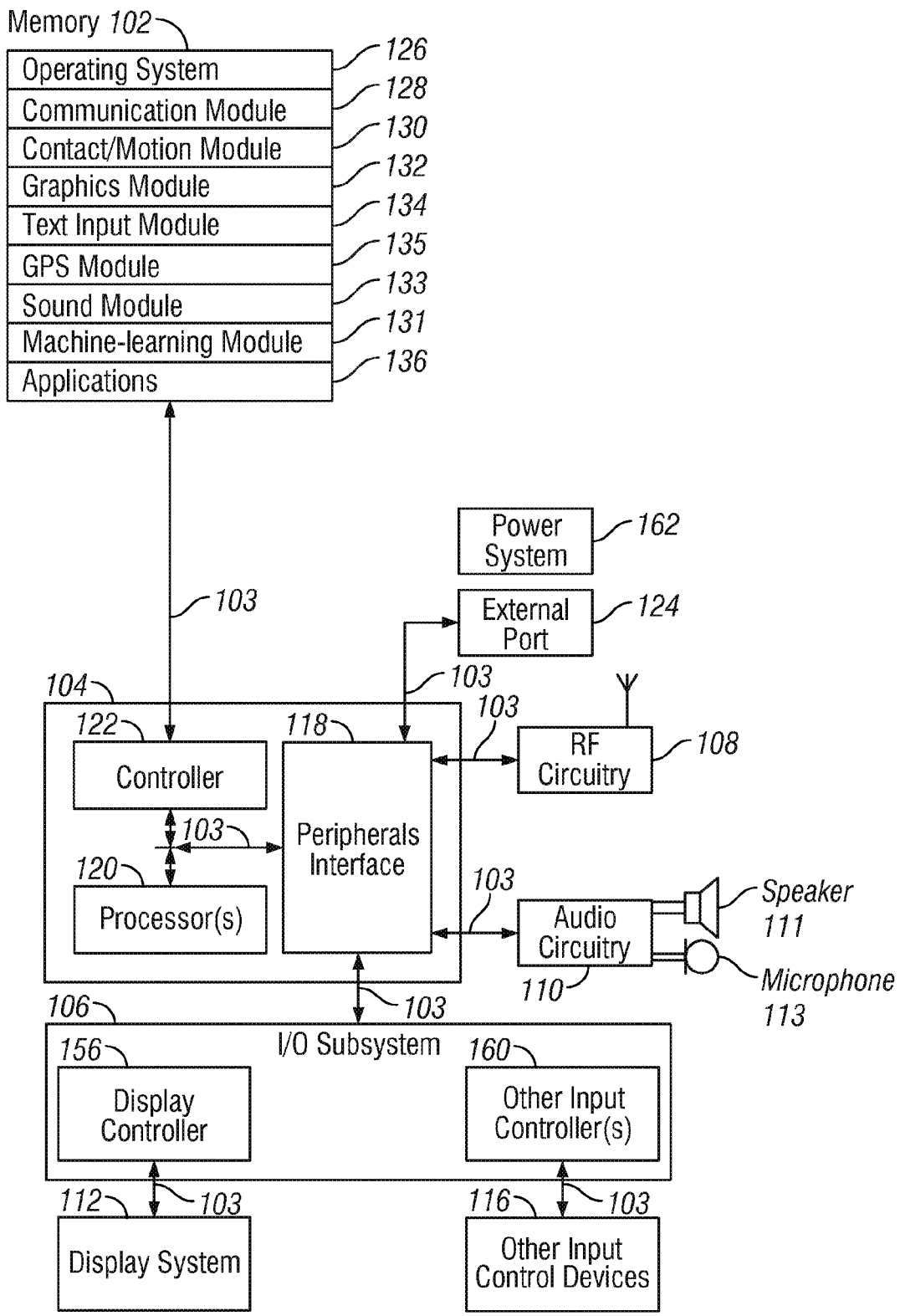
FIG. 1 is a block diagram illustrating one example of a computing device.

FIG. 1 is a block diagram illustrating one example of a computing device 100. In some examples the device is a mobile communications device such as a wireless telephone that also contains other functions, such as PDA and/or music player functions. To that end the device may support any of a variety of applications, such as a telephone application, a video conferencing application, an e-mail application, an instant messaging application, a blogging application, a digital camera application, a digital video camera application, a web browsing application, a digital music player application, and/or a digital video player application. While the example in FIG. 1 is depicted as a mobile communications device, the computing device more generally may by any of a wide variety of different devices such as a laptop computer, a tablet computer, a smart phone and a netbook, for example.

The device 100 includes a memory unit 102 (which may include one or more computer readable storage media), a memory controller 122, one or more processors (CPU's) 120, a peripherals interface 118, RF circuitry 108, audio circuitry 110, a speaker 111, a microphone 113, an input/output (I/O) subsystem 106, other input or control devices 116, and an external port 124. These components may communicate over one or more communication buses or signal lines 103.

It should be appreciated that the device 100 is only one example of a mobile communications device 100 and that the device 100 may have more or fewer components than shown, may combine two or more components, or a may have a different configuration or arrangement of components. The various components shown in FIG. 1 may be implemented in hardware, software or a combination of both hardware and software, including one or more signal processing and/or application specific integrated circuits.

Memory unit 102 may include high-speed random access memory and non-volatile memory, such as one or more magnetic disk storage devices, flash memory devices, or other non-volatile solid-state memory devices. Access to memory unit 102 by other components of the device 100, such as the CPU 120 and the peripherals interface 118, may be controlled by the memory controller 122. The peripherals interface 118 couples the input and output peripherals of the device to the CPU 120 and memory unit 102. The one or more processors 120 run or execute various software programs and/or sets of instructions stored in memory unit 102 to perform various functions for the device 100 and to process data. In some examples the peripherals interface 118, the CPU 120, and the memory controller 122 may be implemented on a single chip, such as a chip 104. In other examples they may be implemented on separate chips.

The RF (radio frequency) circuitry 108 includes a receiver and transmitter (e.g., a transceiver) for respectively receiving and sending RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from audible signals (i.e., sound waves). The speaker 111 and microphone 113 are two examples of audio transducers that may be employed in the mobile communications device. The audio circuitry 110 converts the electrical signal to audio data and transmits the audio data to the peripherals interface 118 for processing. Audio data may be retrieved from and/or transmitted to memory unit 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the display screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some examples input controller(s) 160 may be coupled to any (or none) of the following: a keyboard, infrared port, USB port, and a pointer device such as a mouse.

The display screen 112 provides an input interface and an output interface between the device and a user. The display controller 156 receives and/or sends electrical signals from/to the display screen 112. The display screen 112 displays visual output to the user. The visual output may include graphics, text, icons, video, and any combination thereof (collectively termed "graphics").

The display screen 112 will generally include a suitable display such as an OLED display, PLED display, active matrix liquid crystal display, passive matrix liquid crystal display, electrophoretic display, cholesteric liquid crystal display, polymer dispersed liquid crystal and nematic liquid crystal display. In some implementations the display screen 112 may be a touch-screen display.

The device 100 also includes a power system 162 for powering the various components. The power system 162 may include a portable power supply (e.g., battery) and components necessary to receive power from an alternating current (AC) source, a power management system, a recharging system, a power failure detection circuit, a power converter or inverter and any other components associated with the generation, management and distribution of power in portable devices.

In some embodiments, the software components stored in memory unit 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, a sound module 133 (or set of instructions) and applications (or set of instructions) 136.

The operating system 126 (e.g., Darwin, RTXC, LINUX, UNIX, OS X, Microsoft WINDOWS®, Android or an embedded operating system such as VxWorks) includes various software components and/or drivers for controlling and managing general system tasks (e.g., memory management, storage device control, power management, etc.) and facilitates communication between various hardware and software components. The communication module 128 facilitates communication with other devices over one or more external ports 124 and also includes various software components for handling data received by the RF circuitry 108 and/or the external port 124 (e.g., Universal Serial Bus (USB), FIREWIRE, etc.).

The graphics module 132 includes various known software components for rendering and displaying graphics on the display screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., applications that provide location-based services such as weather widgets, local yellow page widgets, and map/navigation widgets).

The applications 136 may include any combination of the following illustrative modules: a contacts module, a telephone module; a video conferencing module; an e-mail client module an instant messaging (IM) module; a blogging module; a camera module; an image management module; a video player module; a music player module; a browser module; a word processing module; a voice recognition module; a calendar module; widget modules, which may include a weather widget, stocks widget, calculator widget, alarm clock widget, dictionary widget, and other widgets obtained by the user, as well as user-created widgets.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory unit 102 may store a subset of the modules and data structures identified above. Furthermore, memory unit 102 may store additional modules and data structures not described above.

As previously mentioned, a protected mode is a mode that can be activated on a computing device that only allows access to applications, features, or content specified by the device administrator. While in protected mode, specific hardware buttons or on-screen functionality may be disabled or re-mapped to prevent access to features, applications, or content not specified by the device administrator. The administrator can exit from protected mode and restore the device to its normal mode by performing an action that is not easily accomplished or discoverable by other users. For instance, the action may involve entering a password or code, pressing a predetermined sequence of buttons (physical or virtual), performing a special touch gesture, and so on.

By employing the protected mode as described herein, a device administrator is provided with options beyond those available from typical parental controls. Enabling the protected mode on a device that allows the administrator to selectively alter a user's accessibility to software and hardware features effectively creates a secure device that can be given to a user without being concerned that the user can use or otherwise access features specifically designated by the device administrator as being inaccessible to the user. Moreover, if, for instance, the administrator disables the phone or messaging functionality of the device, in some implementations the administrator may also be given the option to allow the device to receive or block incoming calls or messages from being accessed by the user. Accordingly, in one example, the provisioning of a device with a protected mode of operation as described herein provides a worry free and secure means by which a parent can hand a communication device such as a smart phone to a young child so that the child can use it only for entertainment purposes.

Figure 2:
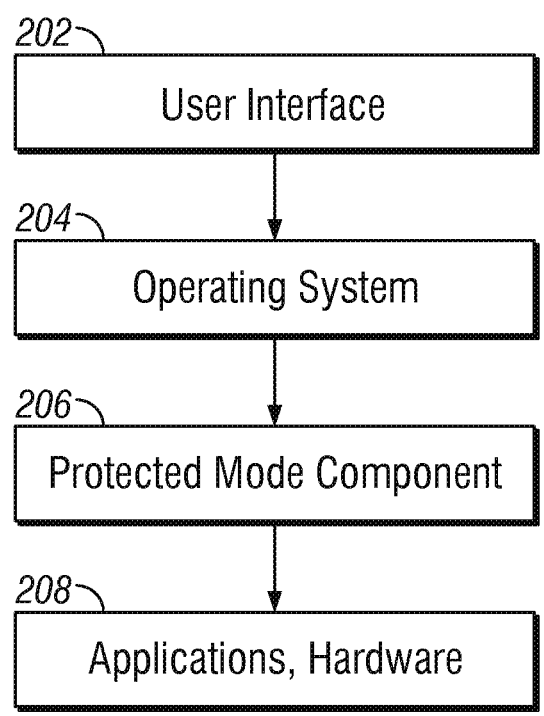
FIG. 2 shows one example of a system for applying control policies to a computing device such as the device shown in FIG. 1.

FIG. 2 shows one example of a system for applying control policies to a computing device such as the device shown in FIG. 1. The system includes a graphical, text-based or other user interface 202 that is presented to a user, through which the user can configure various settings for the protected mode. The user interface 202 interacts with the operating system 204. The operating system 204 interacts with a protected mode component 206 for controlling access to various applications or features 208 of the device, possibly including certain hardware features. In some implementations the protected mode component 206 may be directly incorporated into the operating system.

The user interface 202 allows a user to select which applications or features are accessible while the device is in the protected mode. The user interface 202, which is only accessible when the device is not in the protected mode, provides a list or menu of applications or other features from which the device administrator can select or unselect those specific applications or features that are to be accessible in protected mode. Generally, any application or feature installed on the device which is not included in the list or menu cannot be made inaccessible while the device is in the protected mode. In some implementations the user interface may present a default set of applications or features that are to be accessible (or inaccessible) while the device is in the protected mode.

Figure 3:
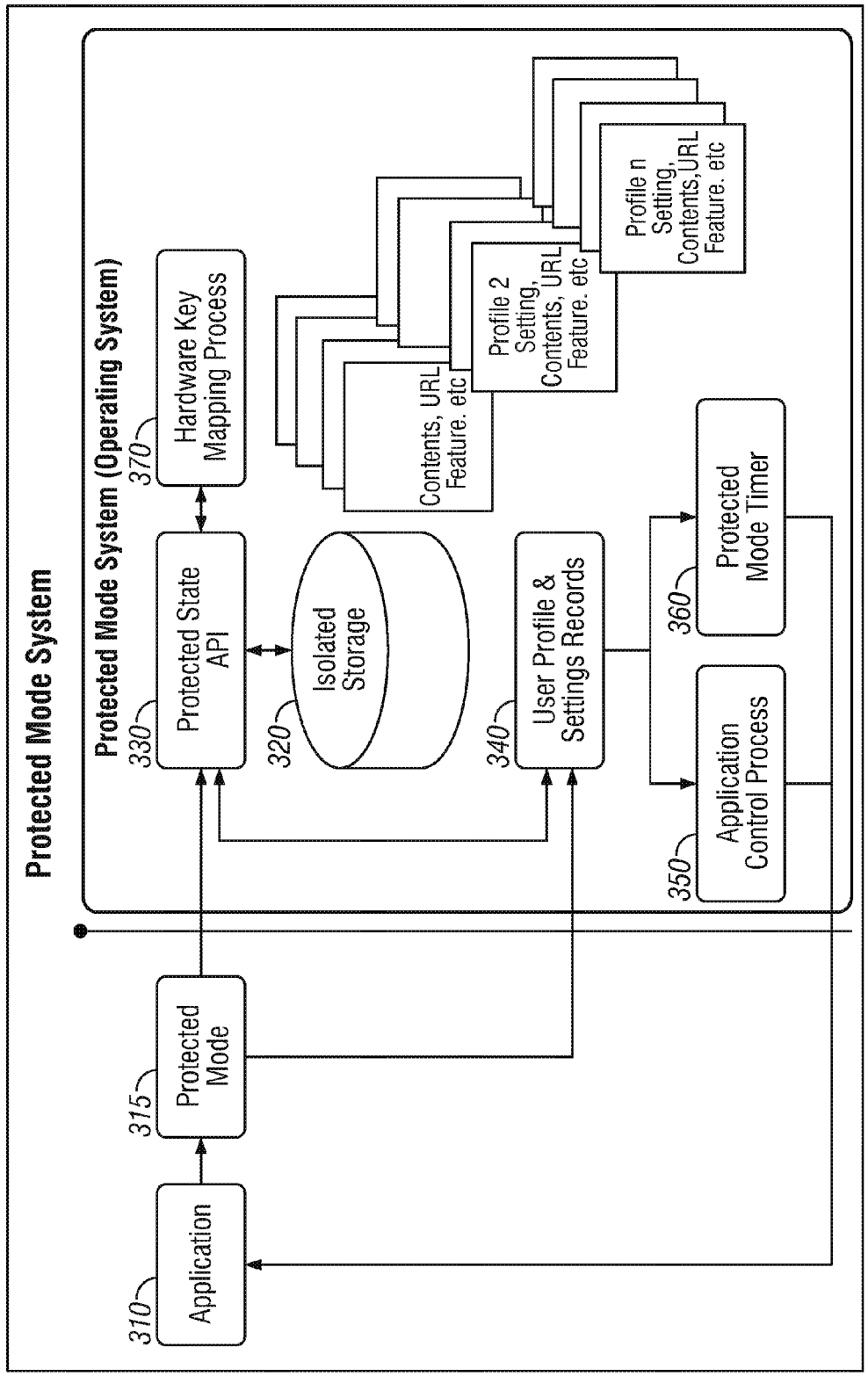
FIG. 3 is a block diagram depicting in more detail one particular implementation of the protected mode component shown in FIG. 2.

FIG. 3 is a block diagram depicting in more detail one particular implementation of the protected mode component 206 shown in FIG. 2. As shown, the protected mode component includes, among other things, a protected mode process 315, protected state API 330, database 320, application control process 350, timer process 360 and hardware reconfiguring processes 370. In operation, activation of an application 310 initiates a protected mode process 315 that communicates with the device operating system via the protected state API 330. The protected mode process 315 accesses a database 320 that is maintained in memory or other storage, which is only accessible to the device administrator by performing a predetermined task such as those discussed above. The database 320 contains records 340 of various user profiles, settings and other information provided by the device administrator through the user interface 202. Activation of the protected mode process 315 initiates an application control process 350. The application control process 350 communicates with the application 310 to control its activity in accordance with the records 340 stored in database 320. In addition, if, for example, one of the settings limits the amount of time that the user can use the application, a timer process 360 is initiated, which locks or otherwise disables the application 310 after expiration of the specified amount of time. The protected state API 330 also performs any necessary hardware reconfiguring processes 370 if the device administrator has specified that any device hardware is to be re-configured (e.g., re-mapping one or more hardware input elements such as keys or buttons so that their functionality is changed).

Figure 4:
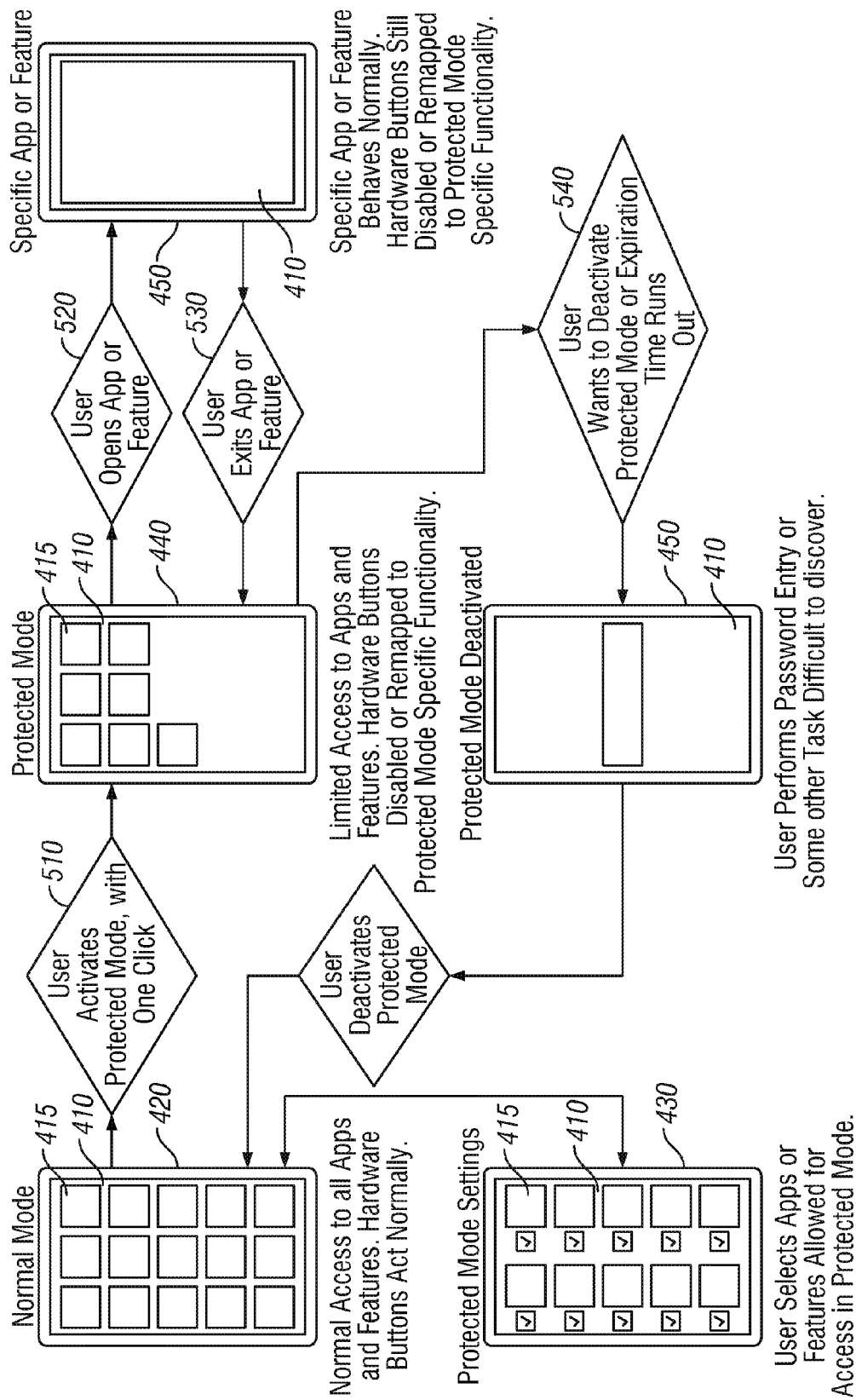
FIG. 4 is a flowchart, accompanied by a graphical representation, illustrating one example of the operation of a computing device having a protected mode system.

FIG. 4 is a flowchart illustrating one example of the operation of a computing device having the protected mode system described herein. Also shown is a corresponding graphical representation of one example of the state in which a computing device 410 may be in during various steps of the process. The graphical representation depicts a display screen on which application icons 415 are presented. Of course, while for clarity the states only depict application icons, those of ordinary skill in the art will recognize that more generally changes in the state of the device may also include changes to other device features as well, such as a change in the functions performed by one or more hardware buttons or the like. As shown, in a normal mode or state 420 of operation the user has full access to all the applications and features and all the device hardware functions normally.

When the device administrator (e.g., a parent) wants to establish a protected mode for a particular user (e.g., a child) a user interface is presented on the display, as indicated when the device 410 is in state 430. In this example while in state 430 the user interface presents a list of applications resident on the device and a series of radio buttons or like which allow the administrator to select the applications or features that can be accessed in the protected mode that is being established. At step 510, the administrator activates the protected mode on the device by entering a passcode or by performing another pre-established task that is to remain unknown to the user. In response, the computing device 410 enters a protected mode state 440, which for simplicity is depicted in state 440 of FIG. 4 by the removal of selected icons from the display. The icons 415 that are removed correspond to the applications or features which the user has indicated as not being accessible to the user while the device was in state 430. Of course, in practice, the selected icons may or may not be removed from or otherwise altered on the display screen. In some implementations, however, the display may indicate to the user which applications or features are inaccessible. For instance, the selected icons may be grayed-out or otherwise changed in appearance.

When in step 520 a user other than the device administrator attempts to access or otherwise use an application or feature that the device administrator has allowed access to while in the protected mode, the application opens and behaves as in the normal mode of operation. This state of the device 410 is represented by state 450. Likewise, when in step 530 the user exits the application or feature, the device 410 remains the protected mode of operation, as indicated once again by state 440. The device 410 remains in the protected mode until the device administrator deactivates it in step 550 after performing the predetermined task (e.g., entering a password) that is required to gain administrative access to the protected mode in step 540. The device 410 is shown in state 450, which shows a user-specifiable field in which a password can be entered to access the protected mode. After deactivating the protected mode the device 410 returns to state 420.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    receiving a request to activate an application on a computing device;
    determining whether the computing device is operating in a normal mode of operation or a protected mode of operation;
    responsive to determining that the computing device is operating in the normal mode of operation, providing access to the application; and
    responsive to determining that the computing device is operating in the protected mode of operation:
        initiating a protected mode process using a protected state application programming interface (API), the initiating comprising:
            accessing a database comprising a record specifying at least one of:
                a first subset of applications associated with the computing device that are to be inaccessible when the computing device is in the protected mode of operation; or
                a second subset of applications associated with the computing device that are to be accessible when the computing device is in the protected mode of operation; and
            determining whether the application is to be inaccessible when the computing device is in the protected mode of operation based upon whether the application is in the first subset of applications or the second subset of applications; and
        initiating an application control process, the application control process communicating with the application via the protected API and the initiating an application control process comprising:
            preventing access to the application responsive to determining that the application is to be inaccessible when the computing device is operating in the protected mode of operation; and
            providing access to the application responsive to determining that the application is not to be inaccessible when the computing device is operating in the protected mode of operation.

2. The method of claim 1, comprising:
    receiving a switch request from an administrative user of the computing device; and
    switching between the normal mode of operation and the protected mode of operation responsive to the receiving a switch request.

3. The method of claim 2, comprising:
    providing an authentication prompt when the switch request is a request to switch from the protected mode of operation to the normal mode of operation, the authentication prompt configured to facilitate authenticating the administrative user.

4. The method of claim 3, the switching comprising:
    switching from the protected mode of operation to the normal mode of operation responsive to authenticating the administrative user via the authentication prompt.

5. The method of claim 1, the request associated with a non-administrative user.

6. The method of claim 1, the computing device comprising a mobile communications device.

7. The method of claim 1, the accessing a database comprising:
    identifying a user associated with the request; and
    accessing a portion of the database associated with the user.

8. The method of claim 1, the providing access to the application responsive to determining that the application is not to be inaccessible when the computing device is operating in the protected mode of operation comprising:
    remapping one or more hardware input elements corresponding to the application to modify a functionality associated with the one or more hardware input elements to generate an application having modified functionality; and providing access to the application having modified functionality.

9. The method of claim 1, the application associated with at least one of a voice service or a text service.

10. An electronic device, comprising:
at least one memory unit; and
a processor operatively associated with the at least one memory unit, the processor configured to:
receive a request to activate a feature on the electronic device;
determine whether the electronic device is operating in a normal mode of operation or a protected mode of operation;
responsive to determining that the electronic device is operating in the normal mode of operation, providing access to the feature; and
responsive to determining that the electronic device is operating in the protected mode of operation:
initiate a protected mode process, comprising:
accessing a database comprising a record specifying at least one of:
a first subset of features associated with the electronic device that are to be inaccessible when the electronic device is in the protected mode of operation; or
a second subset of features associated with the electronic device that are to be accessible when the electronic device is in the protected mode of operation; and
determining whether the feature is to be inaccessible when the electronic device is in the protected mode of operation based upon whether the feature is in the first subset of features or the second subset of features; and
initiate an application control process, comprising:
preventing access to the feature responsive to determining that the feature is to be inaccessible when the electronic device is operating in the protected mode of operation; and
providing access to the feature responsive to determining that the feature is not to be inaccessible when the electronic device is operating in the protected mode of operation.

11. The electronic device of claim 10, the feature comprising an application and the providing access to the feature responsive to determining that the feature is not to be inaccessible when the electronic device is operating in the protected mode of operation comprising:
remapping one or more hardware input elements corresponding to the application to modify a functionality associated with the one or more hardware input elements to generate an application having modified functionality; and
providing access to the application having modified functionality.

12. The electronic device of claim 10, the feature comprising a hardware component of the electronic device.

13. The electronic device of claim 10, the processor configured to:
receive a switch request from an administrative user of the electronic device; and
switch between the normal mode of operation and the protected mode of operation responsive to receiving the switch request.

14. The electronic device of claim 13, the processor configured to:
provide an authentication prompt when the switch request is a request to switch from the protected mode of operation to the normal mode of operation, the authentication prompt configured to facilitate authenticating the administrative user.

15. The electronic device of claim 10, the request associated with a non-administrative user.

16. The electronic device of claim 10, the electronic device comprising a mobile communications device.

17. One or more computer-readable storage media not comprising a propagated data signal and comprising instructions for performing a method on a computing device, the method comprising:
receiving a request to activate an application on the computing device;
determining whether the computing device is operating in a normal mode of operation or a protected mode of operation;
responsive to determining that the computing device is operating in the normal mode of operation, providing access to the application; and
responsive to determining that the computing device is operating in the protected mode of operation:
initiating a protected mode process, comprising:
accessing a database comprising a record specifying at least one of:
a first subset of applications associated with the computing device that are to be inaccessible when the computing device is in the protected mode of operation; or
a second subset of applications associated with the computing device that are to be accessible when the computing device is in the protected mode of operation; and
determining whether the application is to be inaccessible when the computing device is in the protected mode of operation based upon whether the application is in the first subset of applications or the second subset of applications; and
initiating an application control process, the application control process communicating with the application and the initiating an application control process comprising:
preventing access to the application responsive to determining that the application is to be inaccessible when the computing device is operating in the protected mode of operation; and
providing access to the application responsive to determining that the application is not to be inaccessible when the computing device is operating in the protected mode of operation.

18. The one or more computer-readable storage media of claim 17, the providing access to the application responsive to determining that the application is not to be inaccessible when the computing device is operating in the protected mode of operation comprising:
remapping one or more hardware input elements corresponding to the application to modify a functionality associated with the one or more hardware input elements to generate an application having modified functionality; and
providing access to the application having modified functionality.

19. The one or more computer-readable storage media of claim 17, the accessing a database comprising:

identifying a user associated with the request; and
accessing a portion of the database associated with the user.

20. The electronic device of claim 10, the feature comprising a software component of the electronic device.

\* \* \* \* \*